(12) United States Patent
Suzuki et al.

(10) Patent No.: US 7,993,200 B2
(45) Date of Patent: Aug. 9, 2011

(54) GAME DEVICE, CONTROL METHOD OF GAME DEVICE, AND INFORMATION STORAGE MEDIUM

(75) Inventors: Eiji Suzuki, Tokyo (JP); Kazutoshi Sugai, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 948 days.

(21) Appl. No.: 11/910,326

(22) PCT Filed: Jan. 19, 2006

(86) PCT No.: PCT/JP2006/300703
§ 371 (c)(1),
(2), (4) Date: Oct. 1, 2007

(87) PCT Pub. No.: WO2006/103818
PCT Pub. Date: Oct. 5, 2006

(65) Prior Publication Data
US 2009/0054143 A1     Feb. 26, 2009

(30) Foreign Application Priority Data
Mar. 29, 2005  (JP) ................................. 2005-095149

(51) Int. Cl.
*A63F 13/06*        (2006.01)
(52) U.S. Cl. .......................................................... 463/34
(58) Field of Classification Search ...................... 463/34
See application file for complete search history.

(56) References Cited

U.S. PATENT DOCUMENTS

| 6,149,520 A | 11/2000 | Takatsuka |
| 2001/0008850 A1 | 7/2001 | Komata |
| 2001/0008851 A1 | 7/2001 | Komata |
| 2002/0002411 A1 | 1/2002 | Higurashi et al. |
| 2002/0006823 A1* | 1/2002 | Horio ............................ 463/36 |
| 2004/0180709 A1 | 9/2004 | Takahashi et al. |
| 2004/0214623 A1 | 10/2004 | Takahashi et al. |

FOREIGN PATENT DOCUMENTS

| JP | 3145064 B2 | 1/2001 |
| JP | 2003-519546 A | 6/2003 |
| JP | 2003-519547 A | 6/2003 |
| JP | 2004-216165 A | 8/2004 |
| JP | 2004-290657 A | 10/2004 |
| JP | 2004-321303 A | 11/2004 |
| TW | 467755 B | 12/2001 |

* cited by examiner

*Primary Examiner* — Dmitry Suhol
*Assistant Examiner* — Malina K Rustemeyer
(74) *Attorney, Agent, or Firm* — Sughrue Mion, PLLC

(57) ABSTRACT

To provide a game device that allows a user to relatively easily judge a time at which a length of a gauge becomes a length with which desired processing is executed. A first gauge control unit (72) controls the gauge to expand or contract according to continued of pressing of an operation member. A second gauge control unit (74) controls the gauge to expand or contract according to the continued pressing of the operation member, and in particular, switches a change to be given to the gauge between expansion and contraction based on a numerical value output from a controller according to a pressing force with respect to the operation member. A gauge control switching unit (70) causes the second gauge control unit (74) to start gauge control when a length of the gauge is set to a predetermined status by the first gauge control unit (72). A game processing execution unit (80) executes game processing based on the length of the gauge when release of the pressing of the operation member is detected.

10 Claims, 8 Drawing Sheets

FIG.2
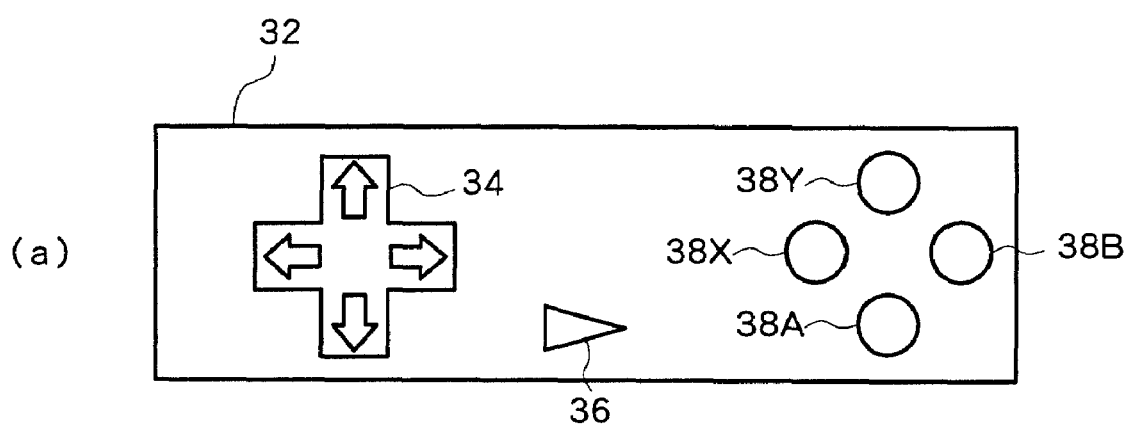
(a)
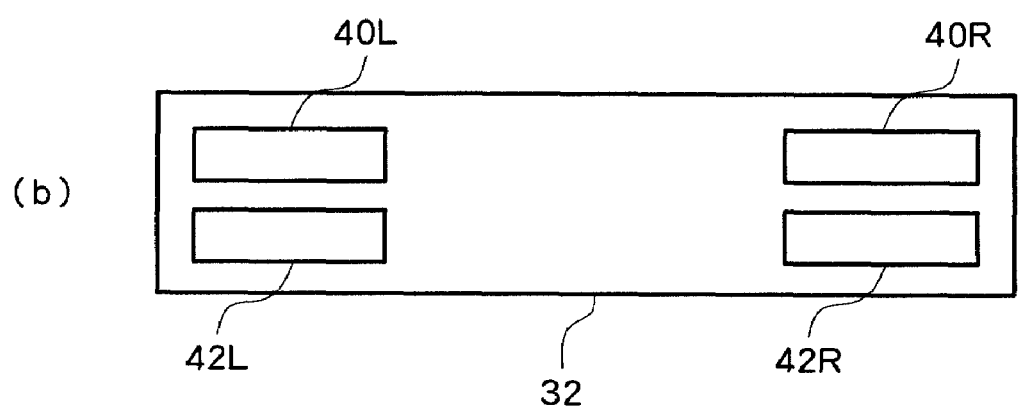
(b)

GAME DEVICE, CONTROL METHOD OF GAME DEVICE, AND INFORMATION STORAGE MEDIUM

TECHNICAL FIELD

The present invention relates to a game device, a control method for the game device, and an information storage medium.

BACKGROUND ART

Gauges are often used for a technique of simplifying inputting of manipulated variables through computers. According to the technique, gauges whose lengths changes with an elapse of time are displayed. Further, in the computer, whether a predetermined operation is made by a user is monitored. In a case where the predetermined operation is made, processing corresponding to the length of the gauge at a time when the predetermined operation is made is executed.

For example, in games replicating ball sports games, such as soccer games or the like, a ball object and player objects are arranged in a virtual three-dimensional space. In addition, a view of the virtual three-dimensional space seen from a viewpoint arranged within the virtual three-dimensional space is displayed on a game screen. In this case, a gauge is appropriately displayed on the game screen and the gauge expands or contracts with the elapse of time. Further, when a predetermined operation such as pressing of buttons or releasing thereof is made by a user, the player object moves (e.g., passes) the ball object by a distance corresponding to the length of the gauge at the time when the predetermined operation is made.

[Patent Document 1] JP 3145064 B

DISCLOSURE OF THE INVENTION

Problems to be Solved by the Invention

The game as described above is desired to have a structure in which the user can relatively easily judge a time at which the length of the gauge reaches a length with which desired processing is executed.

The present invention has been made in view of the above-mentioned problem and it is therefore an object of the invention to provide a game device, a control method for the game device, and an information storage medium that allow the user to relatively easily judge a time at which the length of the gauge reaches a length with which desired processing is executed.

Means for Solving the Problem

To solve the above-mentioned problem, according to one aspect of the present invention, there is provided a game device including a controller that outputs a numerical value according to a pressing force with respect to an operation member, including: gauge display means for displaying a gauge; a first gauge control means for controlling the gauge to expand or contract according to continued pressing of the operation member; a second gauge control means for controlling the gauge to expand or contract according to the continued pressing of the operation member, and switching a change to be given to the gauge between expansion and contraction based on the numerical value output from the controller; gauge control switching means for causing the first gauge control means to start gauge control when the pressing of the operation member is detected, and causing the second gauge control means to start the gauge control when a length of the gauge is set to a predetermined status by the first gauge control means; and game processing execution means for executing game processing based on the length of the gauge when release of the pressing of the operation member is detected.

Further, according to another aspect of the present invention, there is provided a control method for a game device including a controller that outputs a numerical value according to a pressing force with respect to an operation member, including: a gauge display step of displaying, by display means, a gauge; a first gauge control step of controlling the gauge to expand or contract according to continued pressing of the operation member; a second gauge control step of controlling the gauge to expand or contract according to the continued pressing of the operation member, and switching a change to be given to the gauge between expansion and contraction based on the numerical value output from the controller; a gauge control switching step of starting gauge control in the first gauge control step when the pressing of the operation member is detected, and starting the gauge control in the second gauge control step when a length of the gauge is set to a predetermined status in the first gauge control step; and a game processing execution step of executing game processing based on the length of the gauge when release of the pressing of the operation member is detected.

Further, according to still another aspect of the present invention, there is provided a program that causes a computer such as a home game machine, a portable game machine, a commercial game machine, a cellular phone, a personal digital assistant (PDA), and a personal computer to function as a game device including a controller that outputs a numerical value according to a pressing force with respect to an operation member, and also to function as: gauge display means for displaying a gauge; a first gauge control means for controlling the gauge to expand or contract according to continued pressing of the operation member; a second gauge control means for controlling the gauge to expand or contract according to the continued pressing of the operation member, and switching a change to be given to the gauge between expansion and contraction based on the numerical value output from the controller; gauge control switching means for causing the first gauge control means to start gauge control when the pressing of the operation member is detected, and causing the second gauge control means to start the gauge control when a length of the gauge is set to a predetermined status by the first gauge control means; and game processing execution means for executing game processing based on the length of the gauge when release of the pressing of the operation member is detected.

Further, according to yet another aspect of the present invention, there is provided a computer-readable information storage medium storing the program described above. Still further, a program distribution device according to the present invention is a program distribution device including the information storage medium storing the program described above, for reading the program from the information storage medium and distributing the program. Yet further, a program distribution method according to the present invention, while using the information storage medium storing the program described above, for reading the program from the information storage medium and distributing the program.

The present invention relates to a game device including a controller for outputting numerical values corresponding to a pressing force with respect to an operation member. The gauge is displayed in the present invention. When a pressing with respect to the operation member is detected, the gauge expands or contracts according to continuance of the pressing with respect to the operation member. Further, when the length of the gauge is set to a predetermined status, a change to be given to the gauge is switched between the expansion and the contraction based on the numerical value output from the controller. In addition, when a release of the pressing of the operation member is detected, game processing is executed based on the length of the gauge. According to the present invention, the user can relatively easily judge the time at which the gauge reaches the length with which desired processing is executed.

In one example of the present invention, the second gauge control means may start the contraction of the gauge when the numerical value output from the controller satisfies a first predetermined condition, and start the expansion of the gauge when the numerical value output from the controller satisfies a second predetermined condition.

BRIEF DESCRIPTION OF THE DRAWINGS

FIG. 2 are diagrams showing an example of a controller.

BEST MODE FOR CARRYING OUT THE INVENTION

A detailed description of an example of an embodiment of the present invention will hereinafter be given based on the drawings.

Figure 1:
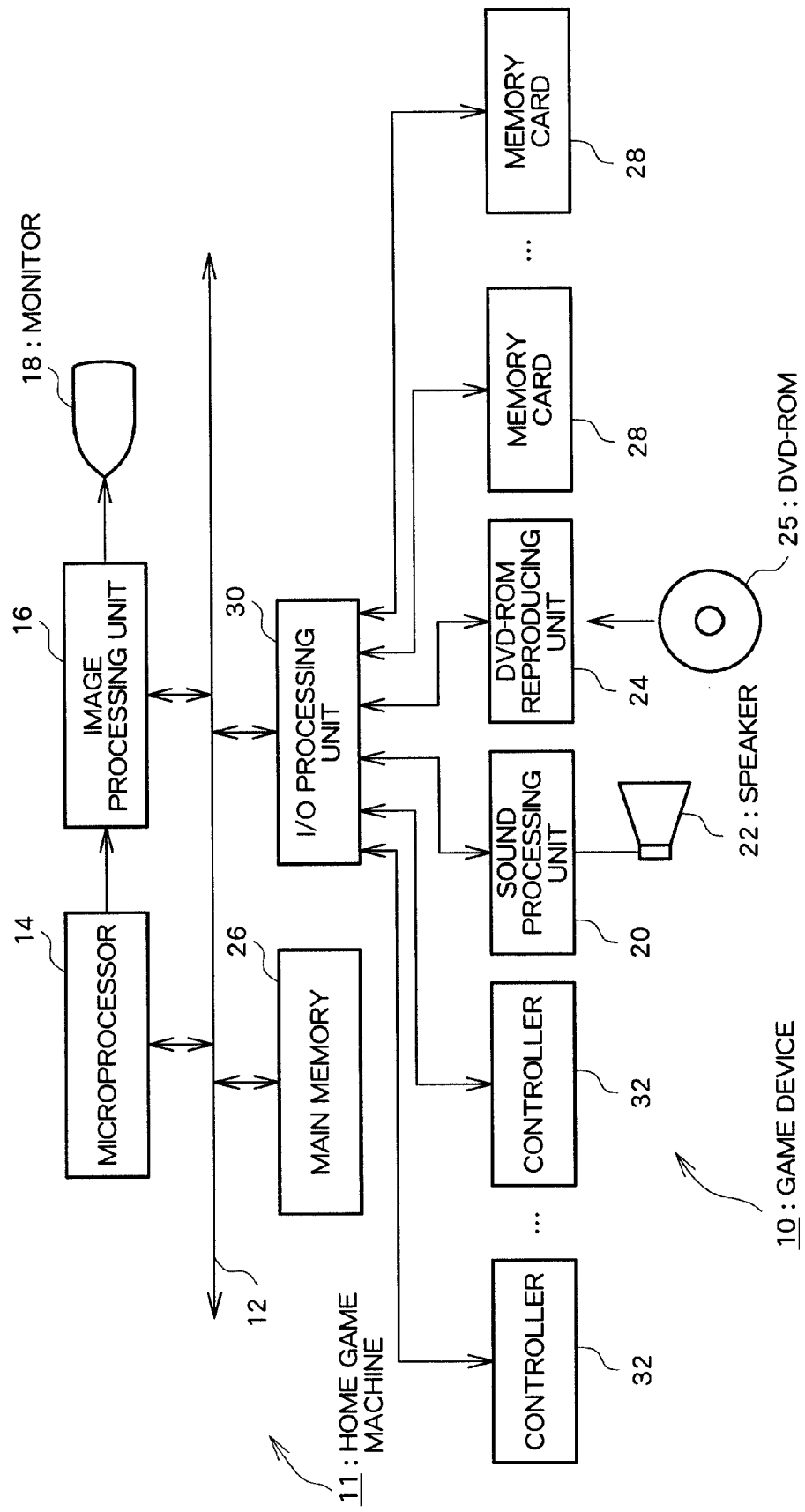
FIG. 1 is a diagram showing a structure of a game device according to an embodiment of the present invention.

FIG. 1 is a diagram showing a structure of a game device according to the embodiment of the present invention. A game device 10 shown in the figure has a structure in which a DVD-ROM 25 and memory cards 28 as information storage medium are inserted into a home game machine 11, and a monitor 18 and a speaker 22 are connected to the home game machine 11. For example, a domestic TV receiving set is used for the monitor 18, and a built-in speaker thereof is used for the speaker 22.

The home game machine 11 is a well-known computer game system comprising a bus 12, a microprocessor 14, an image processing unit 16, a sound processing unit 20, a DVD-ROM reproducing unit 24, a main memory 26, an input/output (I/O) processing unit 30, and controllers 32. An enclosure accommodates the components other than the controllers 32.

The bus 12 is used for exchanging addresses and/or data among the respective units of the home game machine 11. The microprocessor 14, the image processing unit 16, the main memory 26, and the I/O processing unit 30 are connected to each other via the bus 12 so as to be communicable with each other.

The microprocessor 14 controls the individual units of the home game machine 11 based on an operating system stored in a ROM (not shown), a program read from the DVD-ROM 25, and data read from the memory card 28. The main memory 26 comprises, for example, a RAM, and the program read from the DVD-ROM 25 and the data read from the memory card 28 are written in the main memory 26 if necessary. The main memory 26 is also employed as a work memory for the microprocessor 14.

The image processing unit 16, comprising a VRAM, renders a game screen in the VRAM based on image data sent from the microprocessor 14. Then, the image processing unit 16 converts a content thereof into video signals and outputs the video signals to the monitor 18 at predetermined timings.

The I/O processing unit 30 is an interface used for the microprocessor 14 to access the sound processing unit 20, the DVD-ROM reproducing unit 24, the memory card 28, and the controller 32. The sound processing unit 20, the DVD-ROM reproducing unit 24, the memory card 28, and the controller 32 are connected to the I/O processing unit 30.

The sound processing unit 20, comprising a sound buffer, reproduces and outputs, via the speaker 22, various sound data such as game music, game sound effects, and messages that are read from the DVD-ROM 25 and stored in the sound buffer.

The DVD-ROM reproducing unit 24 reads the program stored on the DVD-ROM 25 in accordance with an instruction given from the microprocessor 14. Note that the DVD-ROM 25 is used herein for supplying the program to the home game machine 11. However, any of various other information storage medium such as CD-ROMs, ROM cards or the like may also be used. Further, the program may also be supplied to the home game machine 11 from a far-off area via a data communication network such as the Internet.

The memory card 28 comprises a nonvolatile memory (e.g., an EEPROM). The home game machine 11 has a plurality of memory card slots for insertion of the memory cards 28, whereby the plurality of memory cards 28 can be simultaneously inserted. Each of the memory cards 28 is structured so that the memory card 28 can be inserted into and removed from the memory card slot, and is used for storing various game data such as save data or the like.

The controller 32 is a general-purpose operation input means used for a user to input a variety of game operations. The I/O processing unit 30 scans statuses of respective portions of the controller 32 every certain period (e.g., every 1/60 second), and transfers operation signals expressing scanned results to the microprocessor 14 via the bus 12. Based on the operation signals, the microprocessor 14 judges a game operation made by the user. The home game machine 11 is structured to be connectable with the plurality of controllers 32, and the microprocessor 14 performs the game control based on the operation signals input from the respective controllers 32.

FIG. 2 are diagrams illustrating an example of the controller 32. The controller 32 shown in the figures is a general-purpose game controller. As shown in FIG. 2(a), a front surface of the controller 32 is provided with a direction button 34, a start button 36, and buttons 38X, 38Y, 38A, and 38B. Further, as shown in FIG. 2(b), on an upper side surface of the controller 32, buttons 42L and 42R are respectively provided bilaterally on the front surface side, and buttons 40L and 40R are respectively provided bilaterally on a rear surface side. The direction button 34 has a cross-shape and is generally used for designating a moving direction of a character or a cursor. The start button 36 is a small-sized push button having a triangular shape and is generally used for starting or forcibly ending the game. The buttons 38X, 38Y, 38A, 38B, 40L, 40R, 42L, and 42R are used for other game operations.

Further, the buttons 38X, 38Y, 38A, and 38B are structured as pressure-sensitive buttons. In other words, pressing forces of the buttons 38X, 38Y, 38A, and 38B are detected in the controller 32 and numerical values corresponding to the pressing forces (specifically, numerical values from 0 to 255) are input to the home game machine 11. In the home game machine 11, it can be determined that the button is being pressed based on the numerical value, and in the case where the button is being pressed, the pressing force thereof can be determined based on the numerical value. Note that the numerical value that is input according to the pressing force with respect to the button 38B will hereinafter be referred to as "pressing force value of button 38B", for example.

In the game device 10 having the hardware structure as described above, through execution of a soccer game program read out from the DVD-ROM 25, a soccer game, in which a user operates a player object (player object expressing a soccer player) belonging to an operation target team to aim at causing more score events than an opponent team, is realized.

Figure 3:
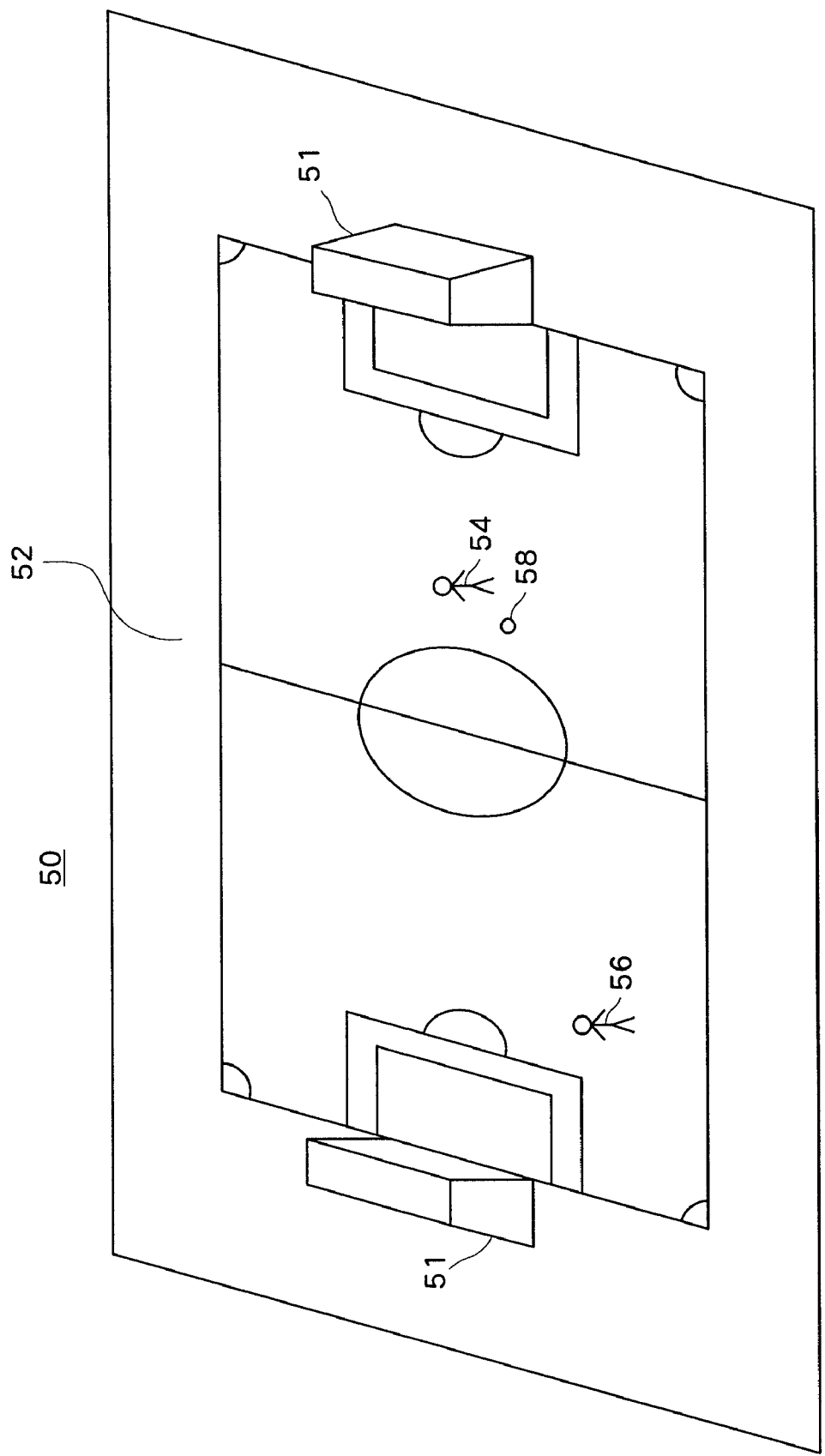
FIG. 3 is a diagram showing an example of a virtual three-dimensional space.

In the game device 10, a virtual three-dimensional space as shown in FIG. 3 is constructed in the main memory 26, for example. As shown in FIG. 3, static objects (objects whose position does not change) such as a soccer field object 52, goal objects 51 and the like are arranged in a virtual three-dimensional space 50, thereby forming a field where a soccer game is to be held. Further, dynamic objects (objects whose position changes) such as a ball object 58 expressing a soccer ball and player objects belonging to the operation target team or the opponent team are arranged on the soccer field object 52. Note that FIG. 3 only shows the player objects 54 and 56. However, 20 more player objects are to be arranged on the soccer field object 52.

In this soccer game, one player object is selected as an operation target among the player objects belonging to the operation target team. The operation target player object is operated through the operation of the controller 32. For example, when the button 38B is pressed and released from the pressing in a state where the operation target player object is holding the ball object 58, the ball object 58 is kicked by the operation target player object to direct a long pass in a direction instructed by the direction button 34. In other words, the ball object 58 starts to move in the direction instructed by the direction button 34. At this time, a carry (moving distance) of the ball object 58 is determined based on the time at which the button 38B is released from the pressing.

Figure 4:
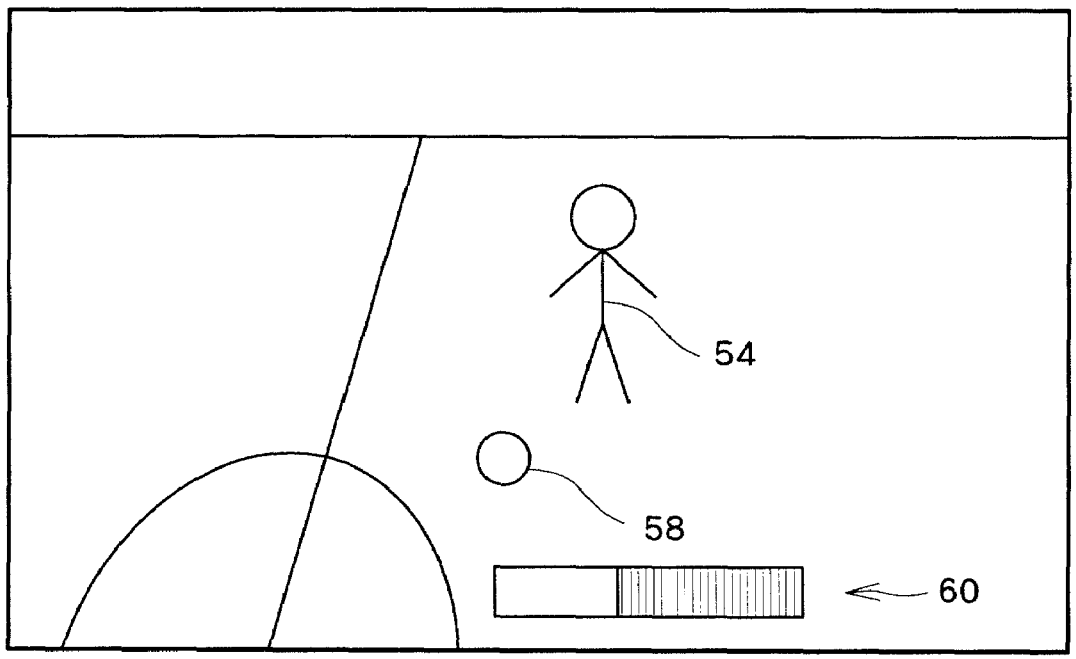
FIG. 4 is a diagram showing an example of a game screen.

Next, a description will be given of the game screen in a case of causing the operation target player object to perform a long pass. FIG. 4 is a diagram showing an example of the game screen displayed on the monitor 18. The game screen shown in FIG. 4 is produced by superimposing a space image and an operation guide image. The space image is produced by setting a viewpoint and a sight line direction in the virtual three-dimensional space 50 on which the soccer field object 52 is arranged, and visualizing a view of the soccer field object 52 seen from the viewpoint in the sight line direction. The operation guide image includes a gauge 60. The gauge 60 is displayed on the game screen when the user presses the button 38B to cause the operation target player object perform a long pass.

Figure 5:
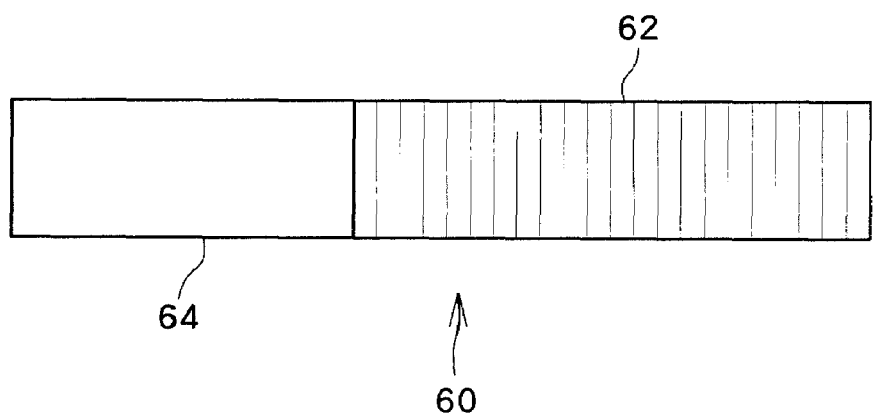
FIG. 5 is an enlarged diagram of a gauge that is displayed on the game screen.

FIG. 5 is an enlarged diagram showing an example of the gauge 60 displayed on a part of the game screen. As shown in FIG. 5, the gauge 60 includes a rectangular frame image 64 and a stretching image 62 which is right-aligned in the frame image 64 and expands and contracts autonomously.

Before the button 38B is pressed, a length of the stretching image 62 is zero. In other words, a left end of the stretching image 62 is overlaid on a right end of the frame image 64. In addition, when the button 38B is kept being pressed, the stretching image 62 extends at a constant speed (first speed) in a left-hand direction with the elapse of time.

Then, when the stretching image 62 extends to a predetermined length (width of the frame image 64), the stretching image 62 expands or contracts thereafter based on the pressing force with respect to the button 38B.

Specifically, when the pressing force with respect to the button 38B becomes equal to or smaller than a predetermined pressing force (first reference pressing force), the stretching image 62 starts to contract. In this case, when the stretching image 62 starts to contract, the stretching image 62 keeps contracting at a constant speed (second speed) until the length of the stretching image 62 becomes zero or until the pressing force with respect to the button 38B becomes equal to or larger than the predetermined pressing force (second reference pressing force larger than the first reference pressing force). In other words, once the contracting of the stretching image 62 is started, even when the pressing force with respect to the button 38B becomes larger than the first reference pressing force, the stretching image 62 continues to contract as long as the pressing force thereof does not become equal to or larger than the second reference pressing force. Note that the second speed is slower than the first speed.

Further, the expansion of the stretching image 62 starts when the pressing force with respect to the button 38B becomes equal to or larger than the second reference pressing force. In this case, when the expansion of the stretching image 62 is started, the stretching image 62 keeps expanding at a constant speed (third speed) until the length of the stretching image 62 reaches a maximum length (width of the frame image 64) or until the pressing force with respect to the button 38B becomes equal to or smaller than the first reference pressing force. In other words, once the expansion of the stretching image 62 is started, even when the pressing force with respect to the button 38B becomes smaller than the second reference pressing force, the stretching image 62 continues to expand as long as the pressing force does not become equal to or smaller than the first reference pressing force. Note that the third speed is slower than the first speed and the second speed.

When the user releases the pressing of the button 38B, a distance corresponding to the length of the stretching image 62 at that point of time is determined as a moving distance of the ball object 58 in the long pass. Thus, the operation target player object kicks the ball object 58 by the determined moving distance (carry).

As described above, in the game device 10, when the operation target player object is to direct a long pass, the user can adjust the moving distance of the ball object 58. In addition, the user interface as described above is prepared as a user interface for the adjustment. As a result, in situations where the adjustment needs to be finished quickly, the user can readily finish the adjustment while the stretching image 62 extends to the maximum length at the first speed for the first time. Further, in situations where the adjustment needs to be made deliberately, such as in free kicks, it is possible to make a deliberate adjustment in a state where the stretching image 62 expands or contracts at the second or third speed which is slower than the first speed. In other words, it is possible to deliberately judge an operation time (pressing/releasing time of the button 38B) at which the moving distance of the ball object 58 becomes a desired distance.

Figure 6:
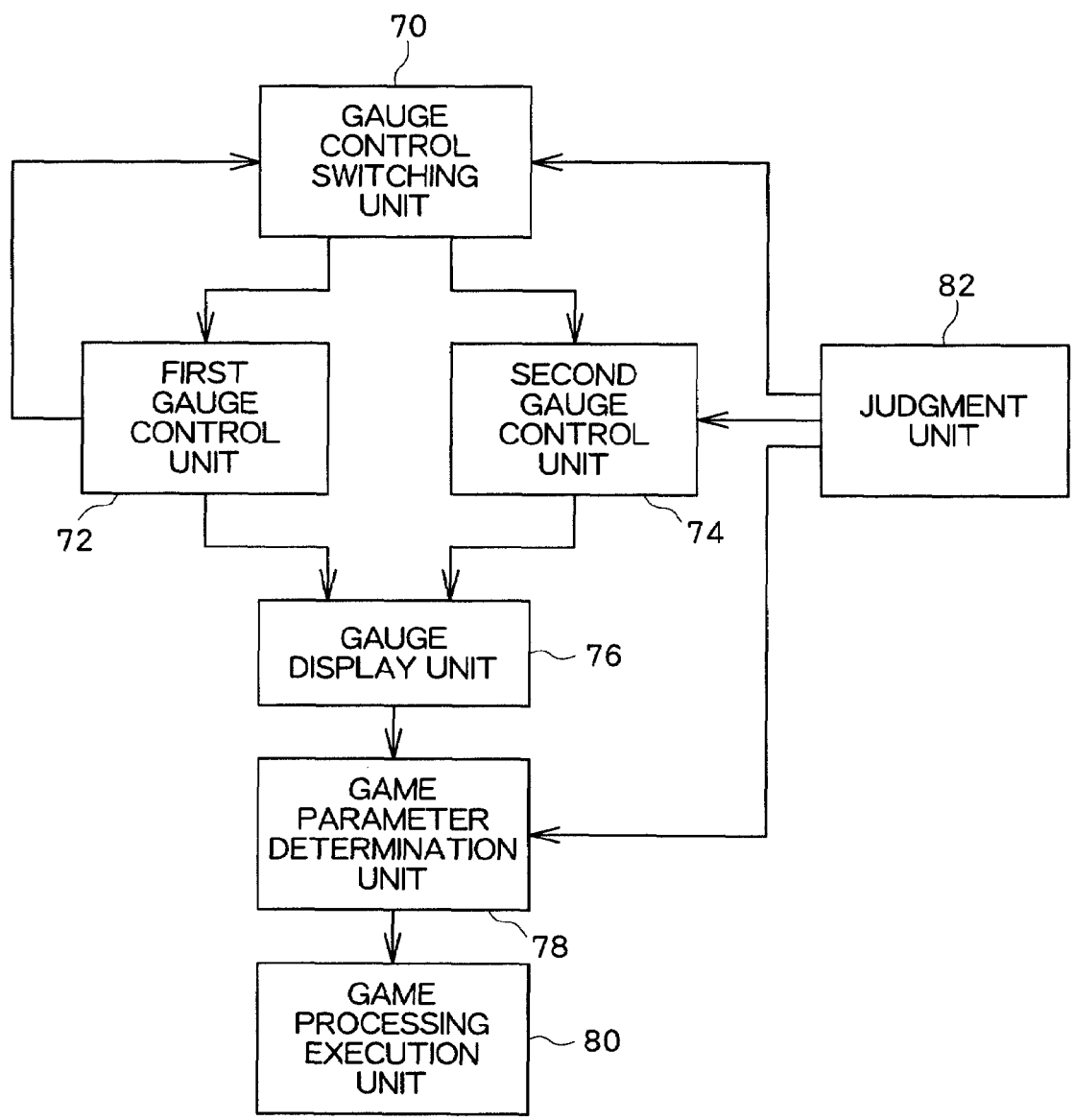
FIG. 6 is a functional block diagram of the game device according to the embodiment of the present invention.

Here, a description will be given of a functional structure of the game device 10. FIG. 6 is a functional block diagram of the game device 10. As shown in FIG. 6, the game device 10 comprises, in terms of functions, a gauge control switching unit 70, a first gauge control unit 72, a second gauge control unit 74, a gauge display unit 76, a game parameter determination unit 78, a game processing execution unit 80, and a judgment unit 82.

[1. Judgment Unit]

The judgment unit 82 judges whether the button 38B (operation member) is pressed and released therefrom. In this embodiment, numerical values from 0 to 255 are input from the controller 32 as the pressing force value of the button 38B. When the button 38B is pressed with a maximum pressing force, "255" is input as the pressing force value of the button 38B. When the button 38B is not being pressed, "0" is input as the pressing force value of the button 38B. When the pressing force value of the button 38B input from the controller 32 becomes equal to or larger than a predetermined pressing judgment criterion value ("128" in this embodiment), for example, the judgment unit 82 judges that the button 38B has been pressed. Further, when the pressing force value of the button 38B input from the controller 32 becomes equal to or smaller than a predetermined release judgment criterion value ("12" in this embodiment), for example, the judgment unit 82 judges that the pressing of the button 38B has been released.

Further, the judgment unit 82 according to this embodiment judges whether the pressing force value of the button 38B is equal to or smaller than a predetermined first reference value ("50" in this embodiment). In addition, the judgment unit 82 judges whether the pressing force value of the button 38B is equal to or larger than a predetermined second reference value ("128" in this embodiment).

[2. Gauge Display Unit]

The gauge display unit 76 comprises the monitor 18. The gauge display unit 76 displays the gauge 60.

[3. First Gauge Control Unit]

The first gauge control unit 72 causes the stretching image 62 to expand or contract according to the continuance of the pressing of the button 38B. In other words, the first gauge control unit 72 causes either an increase or a decrease in the length of the stretching image 62 according to the continuance of the pressing of the button 38B. The first gauge control unit 72 according to this embodiment expands the stretching image 62 according to the continuance of the pressing of the button 38B.

[4. Second Gauge Control Unit]

The second gauge control unit 74 causes the stretching image 62 to expand or contract based on the pressing force value of the button 38B. Specifically, the second gauge control unit 74 switches the change caused in the stretching image 62 between the expansion and the contraction based on the pressing force value of the button 38B. The second gauge control unit 74 according to this embodiment starts the contraction of the stretching image 62 when the pressing force value of the button 38B becomes equal to or smaller than "50" (first reference value). In this case, the second gauge control unit 74 causes the stretching image 62 to contract at the second speed with the elapse of time (continuance of the pressing of the button 38B) until the pressing force value of the button 38B becomes equal to or larger than "128" (second reference value) or until the length of the stretching image 62 becomes zero. Further, the second gauge control unit 74 according to this embodiment starts the expansion of the stretching image 62 when the pressing force value of the button 38B becomes equal to or larger than "128" (second reference value). In this case, the second gauge control unit 74 expands the stretching image 62 at the third speed with the elapse of time (continuance of the pressing of the button 38B) until the pressing force value of the button 38B becomes equal to or smaller than "50" (first reference value) or until the length of the stretching image 62 becomes a maximum length.

[5. Gauge Control Switching Unit]

When the pressing of the button 38B is detected by the judgment unit 82, the gauge control switching unit 70 causes the first gauge control unit 72 to start gauge control and restricts gauge control by the second gauge control unit 74. Further, when the length of the stretching image 62 is set to a predetermined status by the first gauge control unit 72, the gauge control switching unit 70 restricts the gauge control by the first gauge control unit 72 and causes the second gauge control unit 74 to start the gauge control. The gauge control switching unit 70 according to this embodiment causes the second gauge control unit 74 to start the gauge control when the length of the stretching image 62 is controlled to be a maximum length by the first gauge control unit 72.

[6. Game Parameter Determination Unit]

When it is detected by the judgment unit 82 that the pressing of the button 38B has been released, the game parameter determination unit 78 determines a value of a game parameter based on the length of the stretching image 62. The game parameter determination unit 78 according to this embodiment determines a distance corresponding to the length of the stretching image 62 as the moving distance of the ball object 58, by which the operation target player object moves the ball object 58 (by which operation target player object directs a pass).

[7. Game Processing Execution Unit]

The game processing execution unit 80 executes game processing based on the value of the game parameter determined by the game parameter determination unit 78. The game processing execution unit 80 according to this embodiment executes movement control processing of the ball object 58 (pass execution processing) based on the moving distance determined by the game parameter determination unit 78. Specifically, an initial speed vector of the ball object 58 is determined based on the moving distance determined by the game parameter determination unit 78, whereby movement control of the ball object 58 based on the initial speed vector is started.

Figure 7:
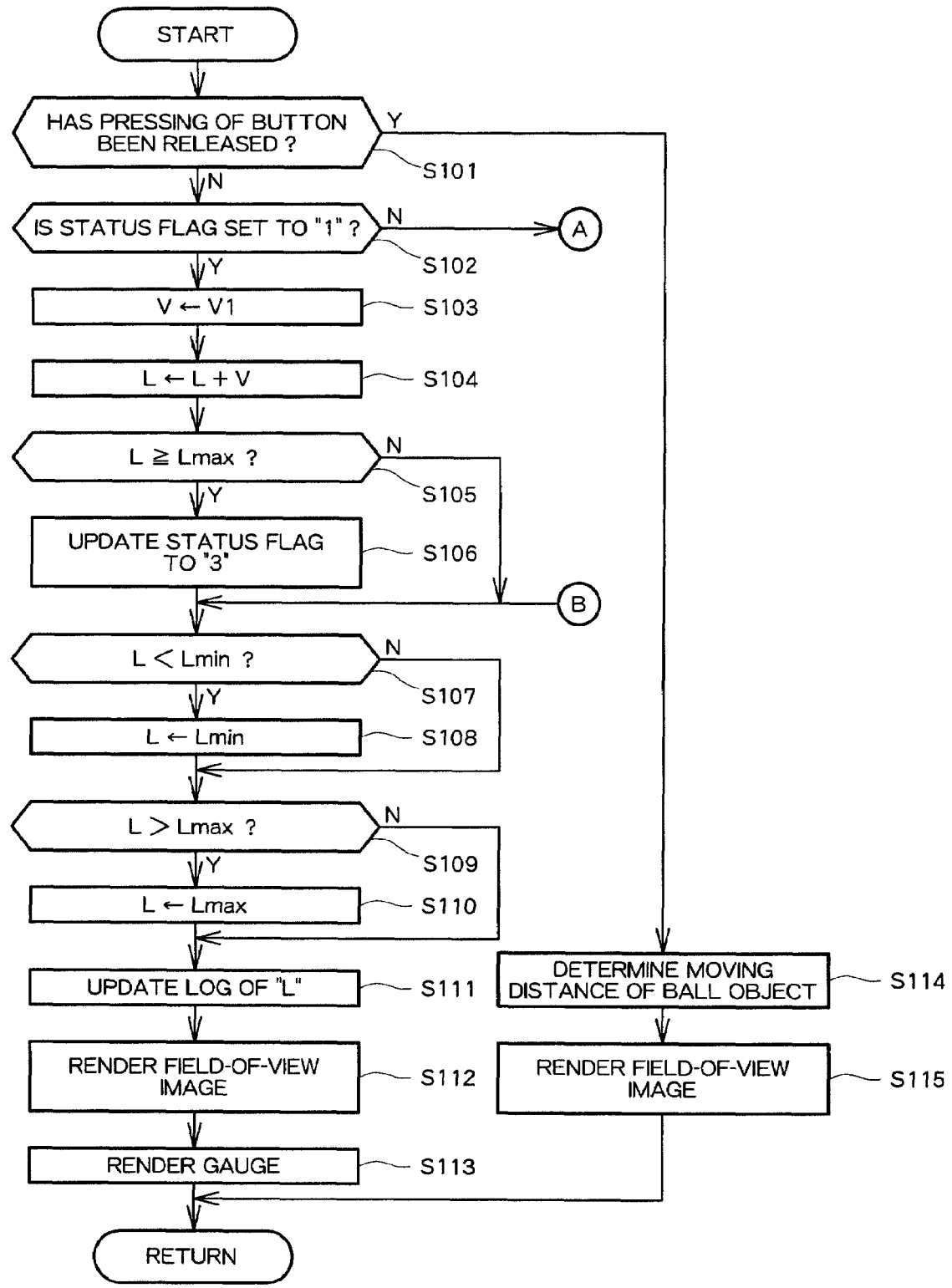
FIG. 7 is a flowchart showing processing executed in the game device.

Here, a description will be given of the game processing executed every predetermined time (e.g., every 1/60 second) in the game device 10. FIG. 7 is a flowchart of processing executed as a part of the game processing after the pressing of the button 38B is detected by the judgment unit 82.

As shown in FIG. 7, in the processing, the judgment unit 82 determines whether the pressing of the button 38B has been released (S101).

When the pressing of the button 38B has not been released, it is determined whether a status flag is set to "1" (S102). The status flag is information retained in the main memory 26 and indicates an expansion/contraction status of the stretching image 62. The status flag takes values of "1", "2", and "3". The status flag "1" indicates a "status of the stretching image 62 while being expanded to the maximum length for the first time after the pressing of the button 38B is detected". The status flag "2" indicates a "contraction status of the stretching image 62 after the stretching image 62 is expanded to the maximum length". The status flag "3" indicates a "re-expanding status of the once-contracted stretching image 62 after the stretching image 62 is expanded to the maximum length". Note that an initial value of the status flag is "1".

When the status flag is set to "1", a variable V is set to "V1" (S103) and a variable L is updated to "L+V" (S104). Here, the variable V is a variable indicating a degree of expansion or contraction of the stretching image 62 for every predetermined time (e.g., every 1/60 second). In other words, the variable V indicates a stretching speed of the stretching image 62. The value "V1" is a predetermined constant that indicates the first speed. The variable L is a variable indicating the length of the stretching image 62, and an initial value thereof is "0".

Subsequently, it is determined whether the value of the variable L is equal to or larger than "Lmax" (S105). Here, the value "Lmax" indicates the maximum length of the stretching image 62. When the value of the variable L is equal to or larger than "Lmax", that is, when the length of the stretching image 62 reaches the maximum length, the status flag is updated to "3" (S106).

On the other hand, when it is determined in S102 that the status flag is not set to "1", it is determined whether the status flag is set to "2" (S116). When the status flag is set to "2", that is, when the stretching image 62 is in the contraction status, it is determined whether the pressing force value of the button 38B is equal to or larger than "128" (S117). When the pressing force value of the button 38B is equal to or larger than "128", the status flag is updated to "3" (S118) and the variable V is set to "V3" (S119). In other words, the status of the stretching image 62 shifts to the expansion status. Note that the value "V3" indicates the third speed and is a predetermined constant that is smaller than "V1". In this case, the value of the variable L is updated to "L+V3" (S123). On the other hand, when the pressing force value of the button 38B is not equal to or larger than "128", the status of the stretching image 62 is kept in the contraction status and the value of the variable L is updated to "L−V2" without updating the variable V (S123).

On the other hand, when it is determined in S116 that the status flag is not set to "2", that is, when the status flag is set to "3", it is determined whether the pressing force value of the button 38B is equal to or smaller than "50" (S120). When the pressing force value of the button 38B is equal to or smaller than "50", the status flag is updated to "2" (S121) and the value of the variable V is set to (−V2) (S122). In other words, the status of the stretching image 62 shifts to the contraction status. Note that the value "V2" indicates the second speed and is a predetermined constant that is smaller than "V1". In this case, the value of the variable L is updated to "L−V2" (S123). On the other hand, when the pressing force value of the button 38B is not equal to or smaller than "50", the status of the stretching image 62 is kept in the expansion status and the value of the variable L is updated to "L+V3" without updating the variable V (S123).

In S107 and S108, the value of the variable L updated in S104 or S123 is updated to "Lmin" when the value is smaller than "Lmin". Note that the value "Lmin" herein indicates a minimum length ("0" in this embodiment) of the stretching image 62. In addition, in S109 and S110, the value of the variable L updated in S104 or S123 is updated to "Lmax" when the value is larger than "Lmax".

After that, a log of the variable L is updated (S111). The main memory 26 holds the log of the value of the variable L during the period from the current time back to a predetermined time ago. In this step, an oldest value of the variable L held in the main memory 26 is discarded and a current value of the variable L is newly added to be stored in the main memory 26. Details thereof will be described later (refer to S114).

Then, a field-of-view image is rendered in the VRAM (S112). In other words, an image showing a view of the virtual three-dimensional space 50 taken from a given viewpoint is produced in the VRAM. After that, the gauge 60 is rendered in the VRAM (S113). In this case, the length (width) of the stretching image 62 is "L".

Further, when it is determined in S101 that the pressing of the button 38B or the like has been released, the distance corresponding to the value of the variable L is determined as the moving distance of the ball object 58 (S114). Here, a "value of 'L' obtained a predetermined time ago" held in the main memory 26 is used as the value of the variable L. When the pressing of the button 38B is released, a certain time is required for determining that the pressing of the button 38B has been released since softening of the pressing force with respect to the button 38B. In order that the determination of the moving distance of the ball object 58 is not affected by the pressing force value input during that time, the "value of 'L' obtained a predetermined time ago" is used in this step.

After that, a field-of-view image is rendered in the VRAM (S115). In other words, an image showing a view of the virtual three-dimensional space 50 taken from a given viewpoint is produced in the VRAM. In this case, the field-of-view image shows a state where the ball object 58 starts to move based on the moving distance determined in S114.

The processing described above is realized by the microprocessor 14 executing the program recorded on the DVD-ROM 25.

As described above, in the game device 10, the operation target player object gives out a long pass based on the pressing of the button 38B and the releasing thereof. The moving distance of the ball object 58 in the long pass is determined based on the length of the gauge 60 (stretching image 62), which is displayed according to the pressing of the button 38B, at the time of release of the pressing of the button 38B. As a result, the user can adjust the moving distance of the ball object 58 in the long pass.

In particular, in the game device 10, the user interface as described above (see FIGS. 4 and 5) is provided as the user interface for adjusting the moving distance of the ball object 58 in the long pass. Thus, in situations where a long pass instruction operation needs to be rapidly made (e.g., during a match), the user can readily finish the adjustment during a period after the button 38B is pressed up until the gauge 60 reaches the maximum length at the first speed. Further, for example, in situations where it is possible to deliberately carry out the long pass instruction operation as in free kicks during which the match is temporarily suspended, the user can deliberately adjust the length of the stretching image 62 in a state where the gauge 60 is expanded to the maximum length first, and then the stretching image 62 expands or contracts at the second or third speed which is slower than the first speed according to the change in pressing force with respect to the button 38B. In other words, according to the game device 10, the user can readily finish the adjustment in situations where the long pass instruction operation needs to be quickly made, and the user can also carry out the adjustment deliberately in situations where it is possible to deliberately carry out the long pass instruction operation.

Note that in soccer games, different user interfaces for the long pass instruction operation (moving distance adjustment of the ball object 58) may be provided in advance for the situations where the long pass instruction operation needs to be quickly made and for situations where it is possible to deliberately carry out the long pass instruction operation. However, with such a structure, there is a fear that the user may become confused about the user interfaces for the long pass instruction operation being changed depending on situations. In addition, the determination on whether the current situation is the situation where it is possible to deliberately carry out the long pass instruction operation is affected by game situations (e.g., number of player objects of the opponent team positioned at the periphery of the operation target player object). In this point, according to the game device 10, the user can take the game situations into consideration to determine whether the current situation is the situation where it is possible to deliberately carry out the long pass instruction operation, to thereby select which of an easy manner or a deliberate manner the long pass instruction operation is to be made in.

Note that the present invention is not limited to the embodiment described above.

For example, the second gauge control unit 74 may change the speed of the expansion/contraction for each switching the expansion and the contraction of the stretching image 62. For example, the second gauge control unit 74 may count the number of times the stretching image 62 changed from the expansion status to the contraction status and the number of times the stretching image 62 changed from the contraction status to the expansion status, and the second gauge control unit 74 may slow down the speed of expansion/contraction of the stretching image 62 based on at least one of those counted numbers. Accordingly, the user can more easily adjust the length of the gauge 60 (stretching image 62). In other words, the user can more easily judge a release time of the pressed button 38B so that the moving distance of the ball object 58 in the long pass becomes a desired distance.

Figure 8:
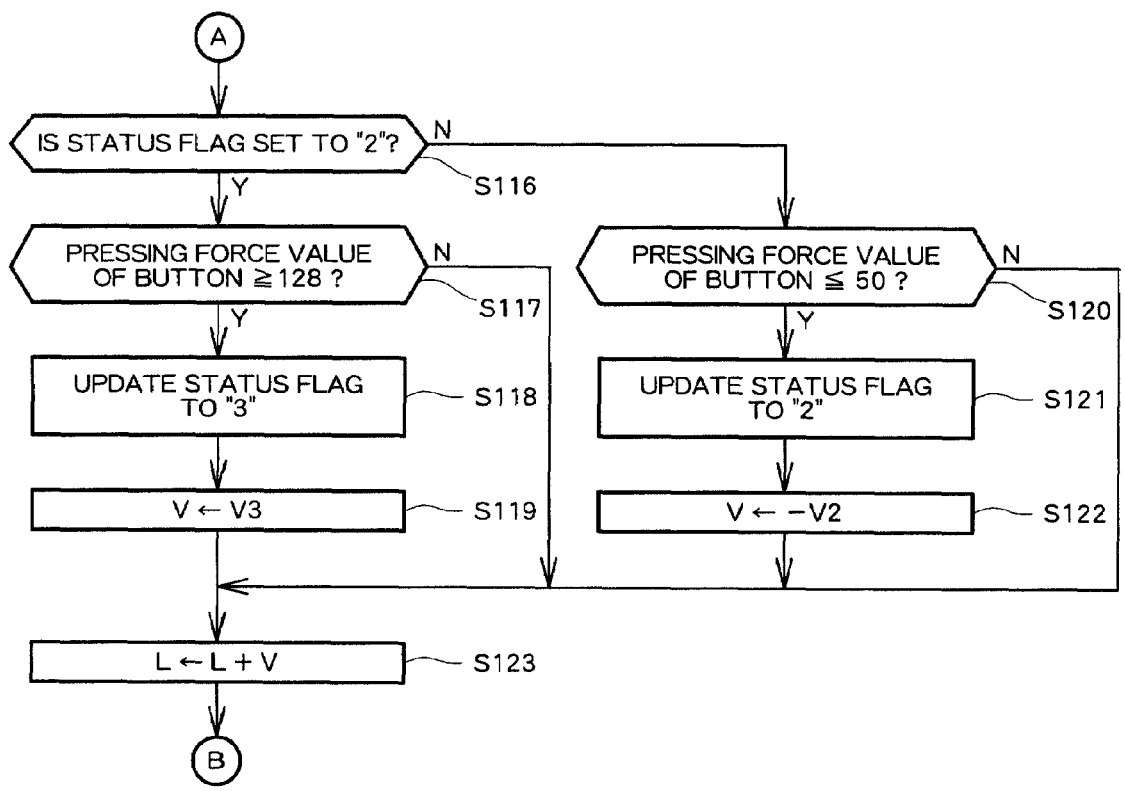
FIG. 8 is a flowchart showing processing executed in the game device.

Further, for example, the second gauge control unit 74 may determine the speed of the expansion and contraction of the stretching image 62 based on the pressing force value of the button 38B. For example, in S119 of FIG. 8, the value of the variable V may be set to "V1×(pressing force value of button 38B/255)". Similarly, in S121 of FIG. 8, the value of the variable V may be set to "(−V1)*(pressing force value of button 38B/255)".

Further, for example, the stretching image 62 may be expanded and contracted based on operations on operation members other than the buttons. For example, in a case where the controller 32 includes a stick-like (lever-like) operation member and a numerical value corresponding to the pressing force with respect to the stick-like operation member (i.e., degree of inclination of the stick-like operation member) is output from the controller 32, the stretching image 62 may be expanded and contracted based on a pressing operation with respect to the stick-like operation member.

Further, for example, application of the present invention is not limited to the soccer game. The present invention can be applied to sports games other than the soccer game. Further, in addition to the sports games, the present invention can be applied to various devices to which manipulated variables are input using gauges.

Figure 9:
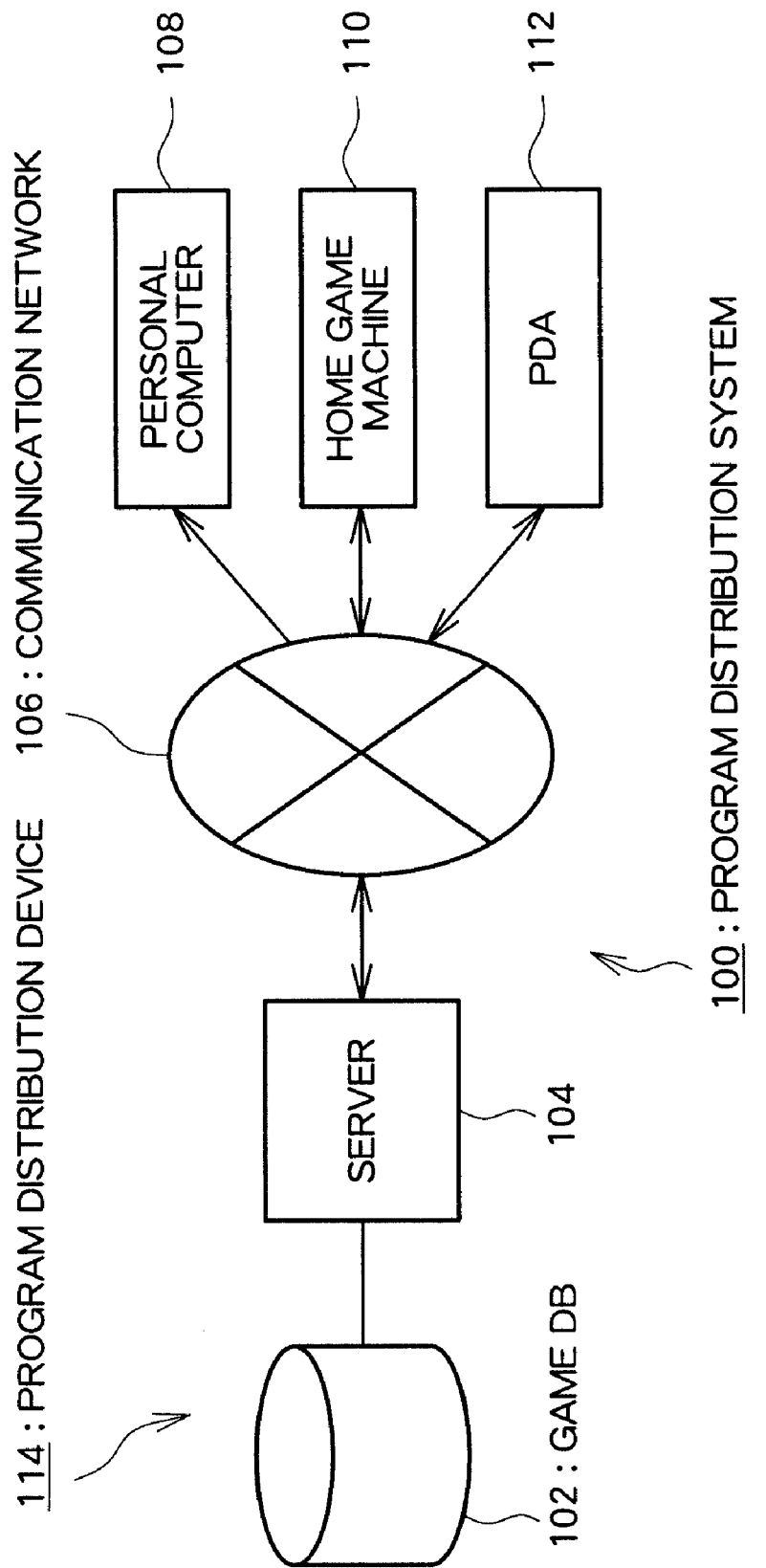
FIG. 9 is a diagram showing an entire structure of a program distribution system according to another embodiment of the present invention.

Still further, in the description given above, the program is supplied to the home game machine 11 from the DVD-ROM 25 serving as the information storage medium. However, the program may also be distributed to homes and the like via the communication network. FIG. 9 is a diagram showing an overall structure of a program distribution system using the communication network. A program distribution method according to the present invention will be described with reference to the figure. As shown in the figure, a program distribution system 100 includes a game database 102, a server 104, a communication network 106, a personal computer 108, a home game machine 110, and a PDA (personal digital assistant) 112. A program distribution device 114 comprises the game database 102 and the server 104. The communication network 106 comprises, for example, the Internet and a cable TV network. In this system, the game database (information storage medium) 102 stores a program identical to the content stored in the DVD-ROM 25. Further, a consumer makes a game distribution request by using the personal computer 108, the home game machine 110, the PDA 112, or the like, whereby the request is transferred to the server 104 via the communication network 106. Then, the server 104 reads the programs from the game database 102 in response to the game distribution request, and transmits the programs to the game distribution requester such as the personal computer 108, the home game machine 110, and the PDA 112. Here, the game is distributed in response to the game distribution request. However, the server 104 may transmit the game in a one-sided manner. Further, all components of the program necessary to realize a game are not necessarily sent at once (collective distribution), and only a necessary component of the program according to an aspect of the game may be sent (divided distribution). By distributing the game via the communication network 106 as described above, the consumer can easily obtain the programs.

The invention claimed is:

1. A game device including a controller that outputs a numerical value according to a pressing force with respect to an operation member, comprising:
    means for displaying a gauge;
    a first means for controlling the gauge to expand or contract according to continued pressing of the operation member;
    a second means for controlling the gauge to expand or contract based on the continued pressing of the operation member, and switching a change to be given to the gauge between expansion and contraction based on the numerical value output from the controller, said numerical value indicative of the pressing force of the operation member that is continually pressed;
    means for causing the first means for controlling to start gauge control and restricting said second means for controlling from said gauge control when the pressing of the operation member is detected, and causing the second means for controlling to start the gauge control and restricting said first means for controlling from said gauge control when a length of the gauge is set to a predetermined status by the first means for controlling; and
    means for executing game processing based on the length of the gauge when release of the pressing of the operation member is detected.

2. The game device according to claim 1, wherein
    the second means for controlling starts the contraction of the gauge when the numerical value output from the controller indicative of the pressing force of the operation member that is continually pressed satisfies a first predetermined condition, and starts the expansion of the gauge when the numerical value output from the controller indicative of the pressing force of the operation member that is continually pressed satisfies a second predetermined condition.

3. A control method for a game device including a controller that outputs a numerical value according to a pressing force with respect to an operation member, comprising:
    displaying, by display means, a gauge;
    first controlling the gauge to expand or contract according to continued pressing of the operation member;
    second controlling the gauge to expand or contract based on the continued pressing of the operation member, and switching a change to be given to the gauge between expansion and contraction based on the numerical value output from the controller indicative of the pressing force of the operation member that is continually pressed;

starting gauge control in the first controlling and restricting the gauge control in the said second controlling when the pressing of the operation member is detected, and starting the gauge control in the second controlling and restricting the gauge control in the first controlling when a length of the gauge is set to a predetermined status in the first controlling; and executing game processing based on the length of the gauge when release of the pressing of the operation member is detected.

4. The game device of claim 1, wherein said second means for controlling determines, for each said switching, a speed of expansion and a speed of contraction based on said numerical value according to said pressing force.

5. The control method of claim 3, wherein said status of the gauge comprises a first status indicative of expansion for a first time after pressing said operation member, a second status indicative of contraction after expansion to a maximum length, and a third status indicative of re-expansion after said expansion and said contraction.

6. The control method of claim 3, wherein said second controlling determines, for each said switching, a speed of expansion and a speed of contraction based on said numerical value according to said pressing force.

7. A non-transitory computer-readable information storage medium storing a program that causes a computer processor program to function as a game device including a controller that outputs a numerical value according to a pressing force with respect to an operation member, and to perform the following steps:

displaying a gauge;

first controlling the gauge to expand or contract according to continued pressing of the operation member;

second controlling the gauge to expand or contract based on the continued pressing of the operation member, and switching a change to be given to the gauge between expansion and contraction based on the numerical value output from the controller indicative of the pressing force of the operation member that is continually pressed;

causing the first controlling to start gauge control and restricting said second controlling from said gauge control when the pressing of the operation member is detected, and causing the second controlling to start the gauge control and restricting said first controlling from said gauge control when a length of the gauge is set to a predetermined status by the first controlling; and executing game processing based on the length of the gauge when release of the pressing of the operation member is detected.

8. The game device of claim 1, wherein said status of the gauge comprises a first status indicative of expansion for a first time after pressing said operation member, a second status indicative of contraction after expansion to a maximum length, and a third status indicative of re-expansion after said expansion and said contraction.

9. The non-transitory computer-readable information storage medium of claim 7, wherein said status of the gauge comprises a first status indicative of expansion for a first time after pressing said operation member, a second status indicative of contraction after expansion to a maximum length, and a third status indicative of re-expansion after said expansion and said contraction.

10. The non-transitory computer-readable information storage medium of claim 7, wherein said second controlling determines, for each said switching, a speed of expansion and a speed of contraction based on said numerical value according to said pressing force.

* * * * *